United States Patent [19]
Savala

[11] Patent Number: 5,822,968
[45] Date of Patent: Oct. 20, 1998

[54] GARDEN TOOL AND SPRAYER

[76] Inventor: Rodney M. Savala, 4324 E. Fairmont, Fresno, Calif. 93726

[21] Appl. No.: 636,873

[22] Filed: Apr. 23, 1996

[51] Int. Cl.$^6$ .................................................. A01D 07/00
[52] U.S. Cl. ................................ 56/400.04; 56/DIG. 18; 239/289
[58] Field of Search .......................... 56/400.04, 400.05, 56/400.06, 400.07, 400.01, DIG. 18; 239/289, 333, 328, 323; 16/110.5; 7/167

[56] References Cited

U.S. PATENT DOCUMENTS

| | | |
|---|---|---|
| 773,743 | 11/1904 | Hoffman . |
| 784,788 | 3/1905 | Gustafson . |
| 1,264,556 | 4/1918 | Postel . |
| 1,275,382 | 8/1918 | Camp . |
| 2,004,295 | 6/1935 | Rothchild . |
| 2,036,990 | 4/1936 | Faveri . |
| 2,638,730 | 5/1953 | Davidson . |
| 2,846,817 | 8/1958 | Haislet . |
| 3,061,202 | 10/1962 | Tyler . |
| 3,143,984 | 8/1964 | Morasch . |
| 3,326,306 | 6/1967 | Weir . |
| 3,515,355 | 6/1970 | Wagner . |
| 3,701,478 | 10/1972 | Tada . |
| 3,724,188 | 4/1973 | Eads . |
| 4,483,133 | 11/1984 | Pasley . |
| 4,489,890 | 12/1984 | Martin . |
| 4,628,674 | 12/1986 | Dougan . |
| 4,901,923 | 2/1990 | McRoskey . |
| 4,933,569 | 6/1990 | Merchlewitz . |
| 5,064,170 | 11/1991 | Feyen . |
| 5,097,909 | 3/1992 | Jauhal . |
| 5,211,118 | 5/1993 | Perkins . |
| 5,339,987 | 8/1994 | D'Andrade . |
| 5,361,849 | 11/1994 | Moore . |
| 5,477,583 | 12/1995 | Deloe .................................. 239/289 X |

Primary Examiner—Terry Lee Melius
Attorney, Agent, or Firm—Mark D. Miller

[57] ABSTRACT

An improved elongated garden implement having a self-contained sprayer for herbicides. The spray nozzle is attached to the working end of the implement (e.g. near the tines of a rake, the blade of a hoe, etc.). The spray from the nozzle is controlled by a valve mechanism inside the handle of the implement, and is operated by a switch or push button on the outside of the handle. The reservoir of herbicide is pressurized using a pump that is integrated into the end of the handle of the implement. By pumping the slidable end of the handle of the implement, pressure can be built up inside the reservoir. Then, activating the switch opens the valve allowing the pressurized herbicide to spray through the nozzle at the opposite end of the implement. A closable opening may be provided in the side of the implement handle for refilling the reservoir, or the handle itself may be unscrewed and separated to facilitate refilling the reservoir. The elongated handle of the implement allows the nozzle to be held very close to the thing (e.g. weed) to be sprayed, thereby allowing an easy way for the user to reach a distant area and spray only a very small quantity of material. This convenient apparatus helps minimize the annoying interruptions to gardening caused by the encounter of distant weeds, and the excessive stooping and bending required by conventional weed sprayers. The apparatus also avoids waste and inadvertent spraying of healthy plants.

9 Claims, 12 Drawing Sheets

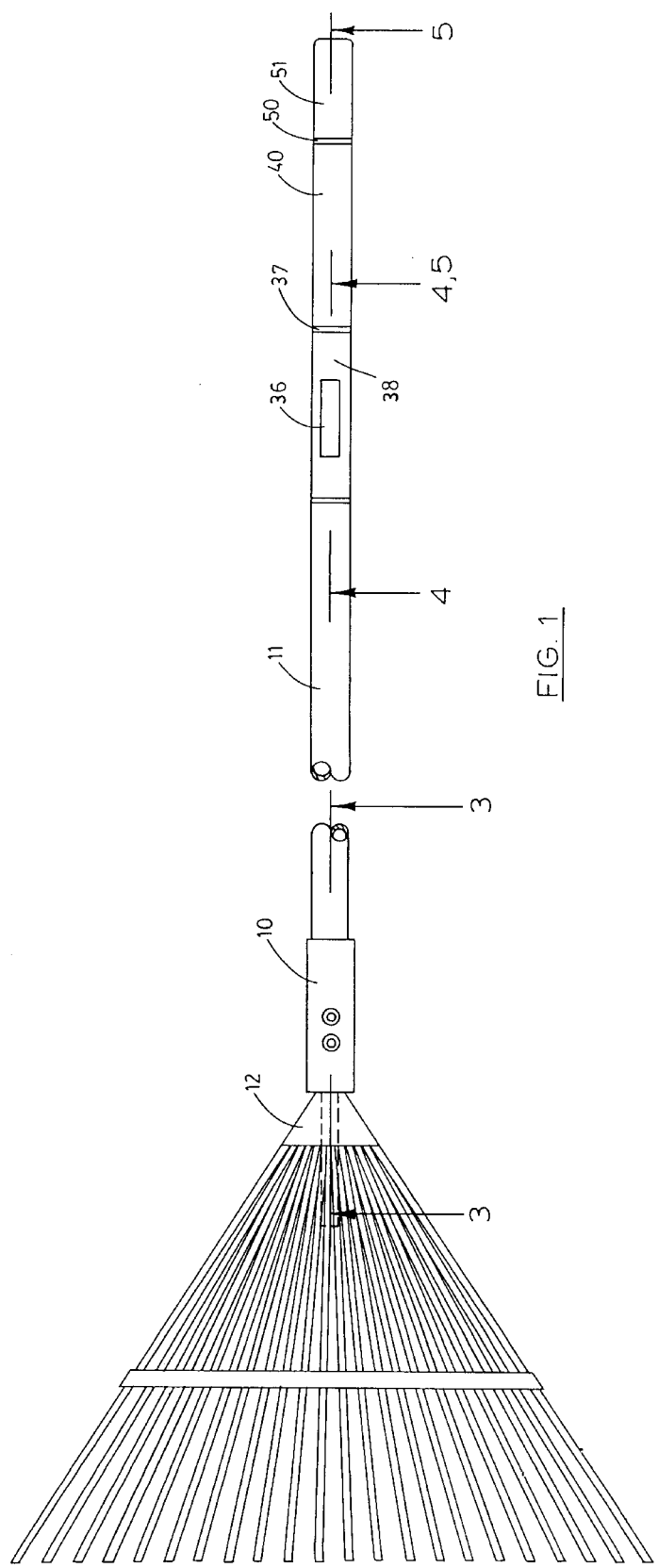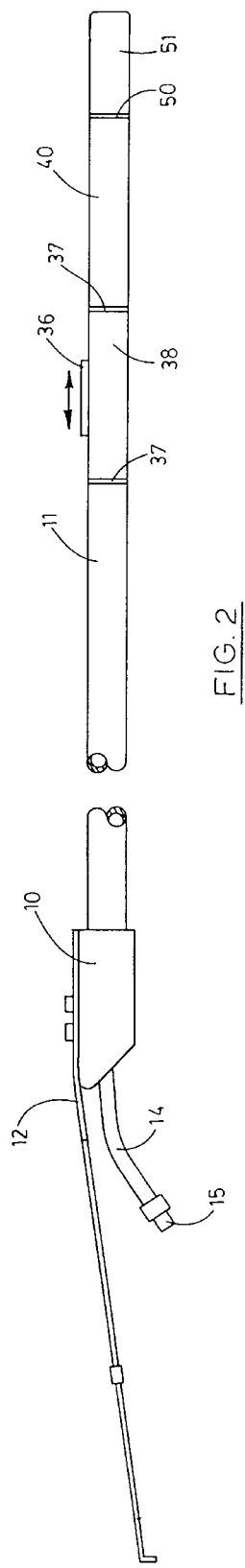
FIG. 1
FIG. 2

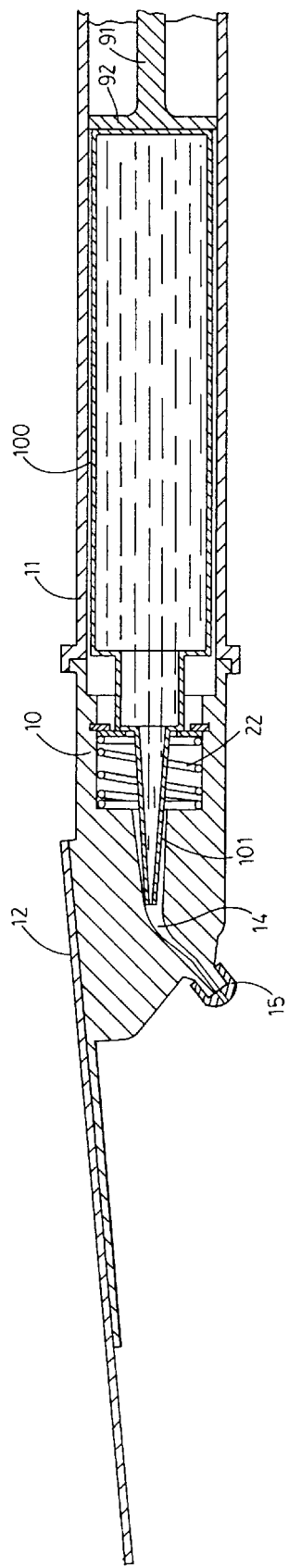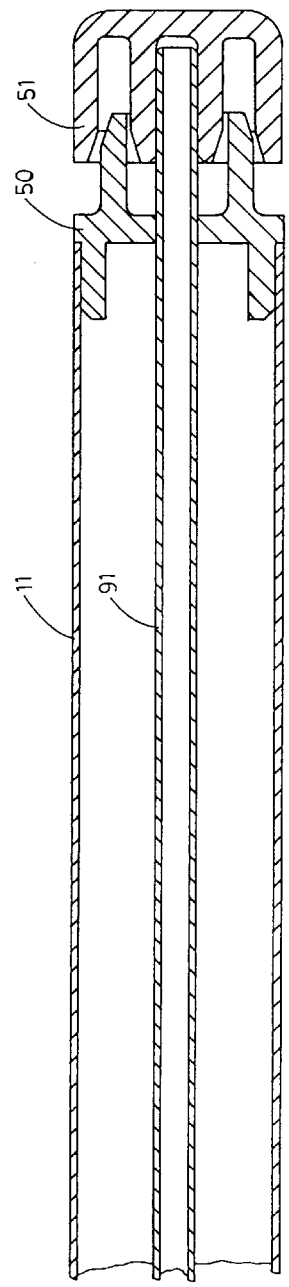

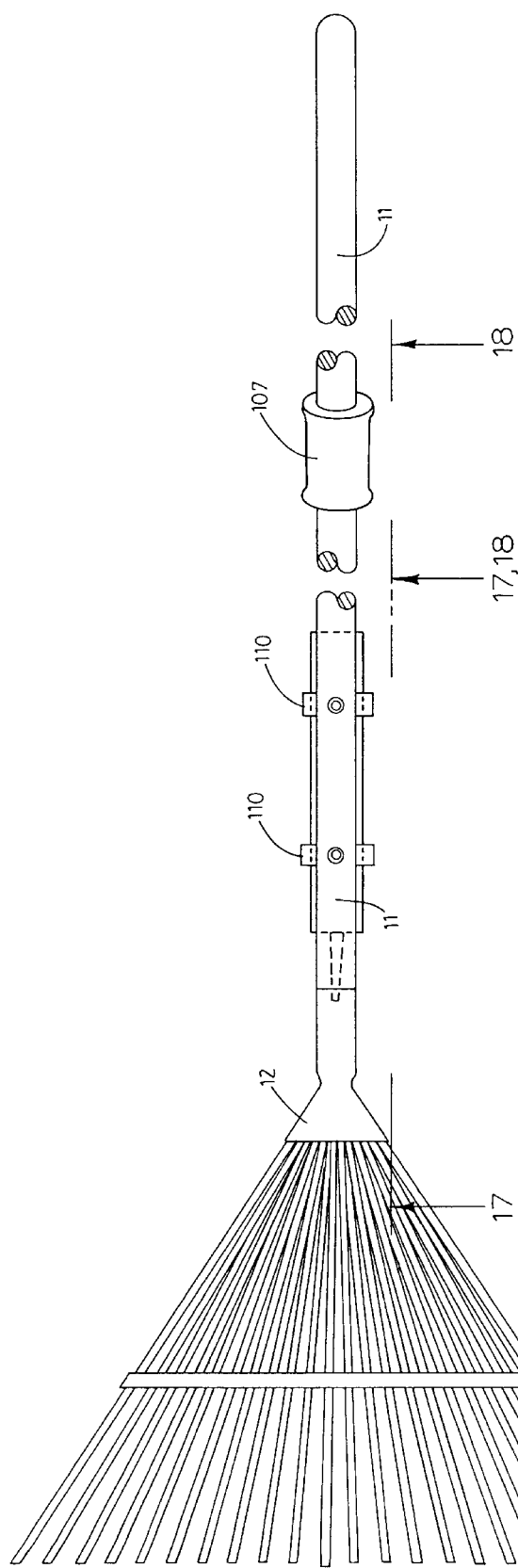
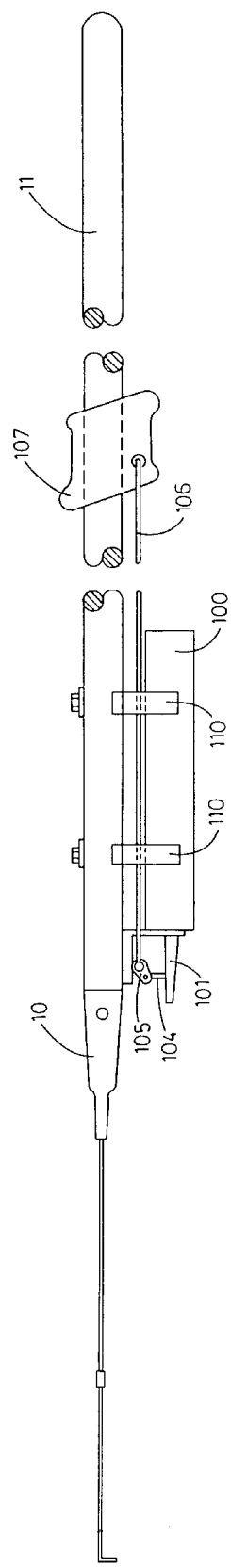
FIG. 15
FIG. 16

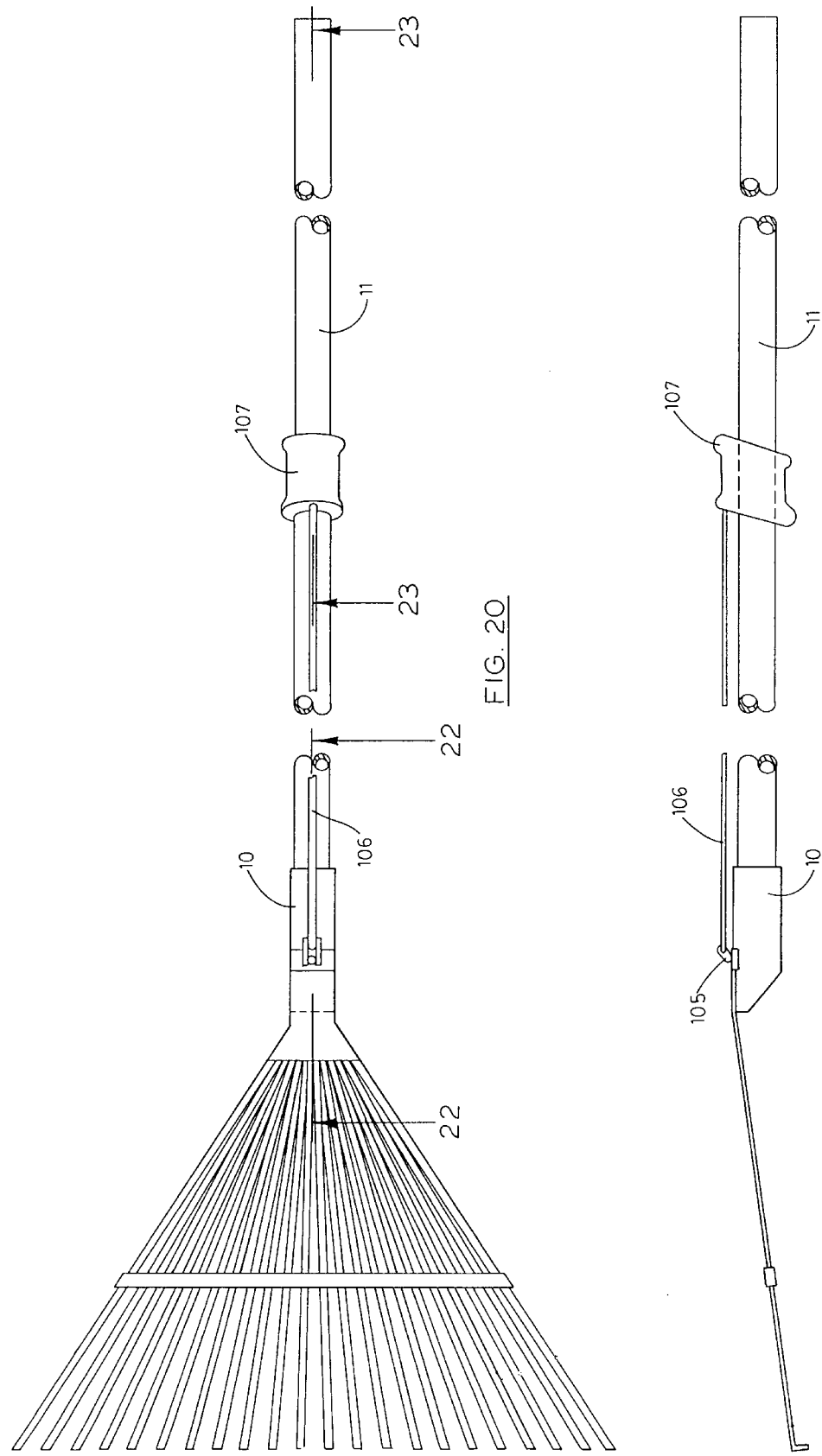

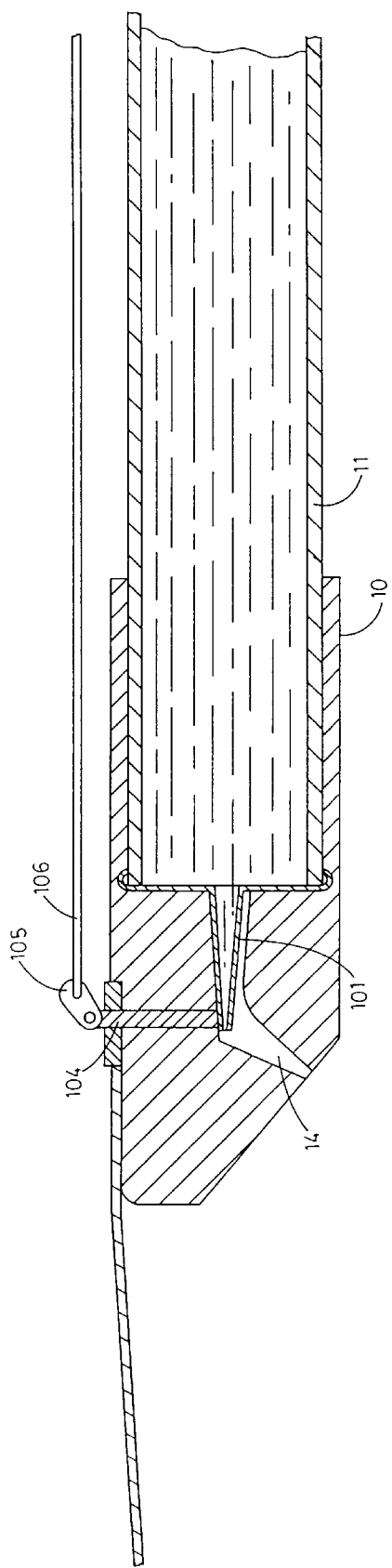
FIG. 22
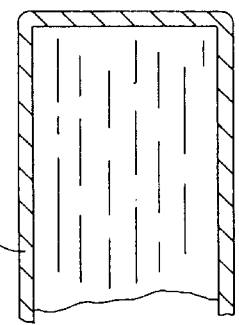
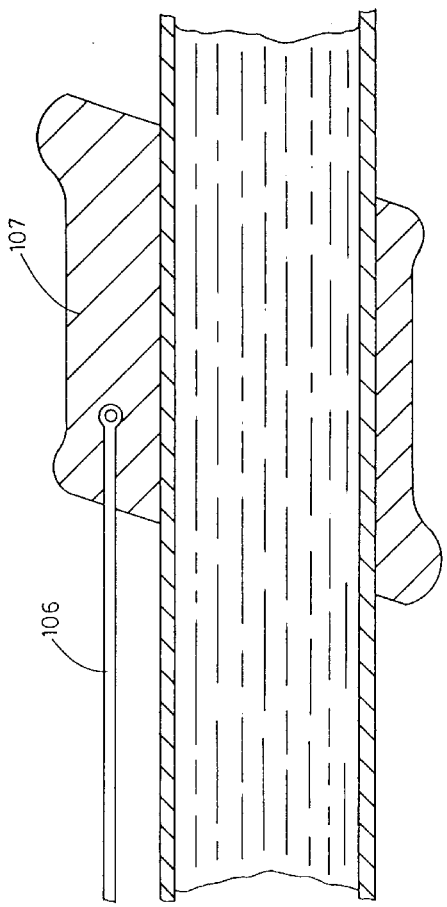
FIG. 23

GARDEN TOOL AND SPRAYER

BACKGROUND OF THE INVENTION

1. Field of the Invention.

The present invention relates to gardening, and in particular to a new and improved apparatus capable of both working and raking the soil and applying small amounts of fluids (e.g. herbicides, pesticides or fertilizers) to very specific areas on the surface of the soil.

2. Description of the Prior Art

Common gardening tools such as shovels, rakes and hoes have been used for centuries. Many such implements have been adapted for simultaneous or alternative use as sprayers. Such implements generally include a conduit or other mechanism for attachment to a water supply, a valve for control of the water, and a spray nozzle mounted somewhere on the implement.

The U.S. Patent issued to Postel (U.S. Pat. No. 1,264,556) describes an early garden tool with a hollow body and a sprinkler nozzle mounted on its head. By attaching the body to a water supply, the head may be used for spraying. Unfortunately, the Postel device does not provide a great deal of control over the spray, and requires an available water supply and a potentially lengthy hose for connection thereto. Similarly, the U.S. Patents issued to Camp (U.S. Pat. No. 1,275,382), Davidson (U.S. Pat. No. 2,638,730) and Morasch (U.S. Pat. No. 3,143,984) each describe garden rakes or hoes that are hose attachable to a water supply, each device having a valve means for controlling the flow of water. The U.S. Patents issued to Haislet (U.S. Pat. No. 2,846,817), Perkins (U.S. Pat. No. 5,211,118) and Moore (U.S. Pat. No. 5,361,849) each describe chopping tools each attachable to a water supply. All but one of the above patents refer to the providing of water either for such things as irrigation, loosening soil, or dousing of burning embers. Haislet describes a tree poisoning axe. None of the above patents disclose a self contained unit having a reservoir of any sort.

A U.S. Patent issued to Von Hoffman (U.S. Pat. No. 773,743) describes a shears implement having a reservoir of herbicide that is compressed whenever the shears are closed. The reservoir is attached by hose means to an external tank. This device suffers from several drawbacks, most notably the difficult adjustment needed to compress the reservoir and the need to operate the shears in order to discharge from the reservoir. This device also has a very limited range of applications because of the small size of the implement and the protective shield attached thereto.

A U.S. Patent issued to Jauhal, et al (U.S. Pat. No. 5,097,909) discloses a garden tool having an internal reservoir for holding hand lotion in the handle that seeps through onto the user's hand while in use. The reservoir is not designed to impart any material to plants or soil in the garden.

The quantity of herbicide ordinarily required to eradicate a single weed or plant is very small, usually no more than a few drops. Often weeds are encountered during the process of raking or hoeing soil and/or debris. In many situations, these isolated weeds may be few in number, and may be very difficult to reach because they are several feet into the garden itself (away from any foot path), near other healthy plants, below a low overhang, or in an area that is otherwise inaccessible. In these common situations, it is highly desirable for the gardener to be able to apply a very small amount of herbicide directly to a weed that is several feet distant in order to kill it. Since these situations may arise in areas that are far removed from any water source, it is also desirable to have a self-contained unit for applying the herbicide. Unfortunately, none of the above described devices is capable of the required self-contained, long-range precision.

In addition, broad spraying of herbicide to eradicate individual weeds is not only wasteful, but may also result in the inadvertent spraying of healthy, desirable plants.

With the advent of plastics in the 19th century, many new and different kinds of spraying devices were developed for home and garden use. There are numerous hand held sprayers and sprayer heads used for liberally applying water, detergents, herbicides, pesticides, fertilizers and other materials to designated areas. Some of these hand operated pump sprayers are disclosed in U.S. Pat. No. 3,061,202 (Tyler), U.S. Pat. No. 3,701,478 (Tada) and U.S. Pat. No. 4,489,890 (Martin). Although adjustability is provided in such spray nozzles to adjust the spray from a mist to a jet, a large quantity of fluid must be sprayed in the jet setting in order to reach a target (e.g. a weed) that is several feet distant. The excess herbicide spray from such a jet, as well as the left over droplets on the spray nozzle are wasteful and likely to land on healthy plants, killing them.

There are also many sprayer shut off valves known in the art that are used with conventional herbicide sprayers including U.S. Pat. No. 4,933,569 (Merchlewitz) and U.S. Pat. No. 5,064,170 (Feyen). These sprayer valves are also so far removed from the sprayer nozzle that they suffer from the same drawbacks stemming from excess herbicide.

It is altogether too common that, upon discovery of an undesirable distant weed, in order to eradicate the weed, the gardener must stop what he is doing, obtain a herbicide sprayer, make sure the sprayer has herbicide in it, return to the weed, and then attempt to apply the herbicide from a distance. It is therefore highly desirable to avoid this annoying interruption in gardening work caused by undesirable distant weeds.

SUMMARY OF THE INVENTION

The present invention overcomes these drawbacks and shortcomings by providing an improved elongated garden implement having a self-contained reservoir for holding a fluid (such as a herbicide) that is in communication with a spray nozzle attached to the end of the implement. The spray from the nozzle is controlled by a valve mechanism adjacent to the nozzle that is activated using a slidable switch or push button on the handle of the implement. The nozzle is provided at the working head of the implement (e.g. above or below the tines of a rake, above the blade of a hoe, etc.).

In one embodiment of the invention, a reservoir is provided that can be pressurized using a pump that is integrated into the handle of the implement. A channel connecting the reservoir to the nozzle includes a valve between the reservoir and nozzle. A slidable pump is integrated into the end of the handle of the implement to provide pressure to the reservoir. By pumping the slidable end of the handle of the implement, pressure can be built up inside the reservoir. Then, activating the switch opens the valve between the reservoir and the nozzle tube, allowing material under pressure in the reservoir to escape. The pressurized material travels down the nozzle tube opening another valve allowing it to escape and spray through the nozzle. A closable opening is provided in the side of the implement handle for refilling the reservoir. Alternatively, the handle itself may be unscrewed and separated to facilitate refilling the reservoir.

The elongated handle of the implement allows the nozzle to be held very close to the thing (e.g. weed) to be sprayed, thereby allowing an easy way for the user to reach a distant area and spray only a very small quantity of material. This convenient apparatus avoids excessive stooping and bending by the user and also avoids waste and inadvertent spraying of other things (e.g. healthy plants).

In a second embodiment, the handle of the implement is designed to accept a removable cartridge filled with fluid such as pesticide or herbicide. The cartridge replaces the reservoir inside the handle of the first embodiment. The cartridge is provided with a blister seal that is broken as the handle is closed on it, allowing the contents to flow into the handle and communicate with the valve and nozzle. The contents may then be sprayed to the outside using a similar pumping action in the handle.

In a third embodiment, a removable pressurized cartridge reservoir having a closed, deformable pointed end is provided inside the handle. The spring loaded cavity which accepts the cartridge has a funnel area for receiving the pointed end. Force may be transmitted to the cartridge using a similar pumping action. Such force deforms and opens the pointed end allowing the pressurized material inside to escape through the funnel to the outside through a spray nozzle.

In a fourth embodiment, a removable pressurized cartridge reservoir having a closed, deformable pointed end is provided on the outside of the handle. A slidable switch is provided on the outside of the handle which communicates with the deformable end of the cartridge through a series of motion transferring members. As the switch is moved, the deformable end is opened allowing the pressurized material inside to spray out.

In a fifth embodiment, a removable pressurized cartridge reservoir having a closed, deformable pointed end is provided inside the handle. A slidable switch is provided on the outside of the handle which communicates with the deformable end of the cartridge through a series of motion transferring members. As the switch is moved, the deformable end is opened allowing the pressurized material inside to spray out through an opening in the handle.

It is therefore a primary object of the present invention to provide a long-handled stand-alone garden tool that doubles as a convenient sprayer for use in spraying selected areas of a garden.

It is also a primary object of the present invention to provide a garden tool combined with an integrated self-contained apparatus for applying very small amounts of herbicide or other material to specific areas in a garden that avoids the wasteful use of excess herbicide or other material thereby protecting healthy plants from potential damage from such waste.

It is a further important object of the present invention to provide a long-handled garden tool combined with an integrated self-contained apparatus that allows convenient direct application of small amounts of herbicide or other material to plants or other areas that are several feet distant from the user without bending or stooping, or creating wasteful or hazardous excess.

It is a further object of the present invention to provide a long handled garden tool combined with a convenient integrated self-contained apparatus for spraying small amounts of herbicide on difficult to reach weeds discovered during gardening.

It is a further object of the present invention to provide a long handled rake combined with an integrated self-contained apparatus for spraying small amounts of herbicide onto potentially distant weeds uncovered during the raking process.

It is a further object of the present invention to provide a long handled hoe combined with an integrated self-contained apparatus for spraying small amounts of herbicide onto potentially distant weeds uncovered during the hoeing process.

It is a further object of the present invention to provide a long handled garden tool combined with a convenient integrated self-contained pressurized spraying apparatus operable using an integrated hand pump to create pressure, and a switch to control the spraying of small amounts of herbicide.

It is a further object of the present invention to provide a long handled garden tool combined with a convenient integrated self-contained spraying apparatus having a removable reservoir with a flexible pointed end, and an integrated hand pump for activating the spray from the reservoir.

It is a further object of the present invention to provide a long handled garden tool combined with a convenient integrated self-contained spraying apparatus having a removable pressurized reservoir with a flexible pointed end, and a switch mechanism for selectively deforming the pointed end to allow the pressurized spray to escape from the reservoir.

It is a further object of the present invention to provide a long handled garden tool combined with a convenient spraying apparatus attached on the outside of the handle including a removable pressurized reservoir with a deformable pointed end, and a switch mechanism for selectively deforming the pointed end to allow the pressurized spray to escape from the reservoir.

Additional objects of the invention will be apparent from the detailed descriptions and the claims herein.

BRIEF DESCRIPTION OF THE DRAWINGS

FIG. 1 is a top plan view of a rake embodiment of the present invention showing the location of the spray nozzle, activation switch and integrated pump.

FIG. 2 is a side view of the rake embodiment shown in FIG. 1.

FIG. 8A is a cross-sectional view along line 8A—8A of FIG. 8 showing the crucible configuration of the check ball holder.

FIG. 13 is a detail cutaway side view of the forward end of the hollow handle of the present invention along line 13—13 of FIG. 11 showing detail of the reservoir and spray mechanism inside the detachable handle.

FIG. 14 is a detail cutaway side view of the back end of the hollow handle of the present invention along line 14—14 of FIG. 11 showing detail of the pump mechanism.

FIG. 15 is a top plan view of yet another alternative rake embodiment of the present invention showing the location of the spray nozzle, exterior reservoir and activation switch.

FIG. 16 is a side view of the alternative embodiment shown in FIG. 15.

FIG. 20 is a top plan view of yet another alternative rake embodiment of the present invention showing the location of the spray nozzle, removable reservoir and activation switch.

FIG. 21 is a side view of the alternative embodiment shown in FIG. 20.

FIG. 22 is a detail cutaway side view of the forward end of the hollow handle of the present invention along line 22—22 of FIG. 20 showing detail of the reservoir and spray mechanism inside the detachable handle.

FIG. 23 is a detail cutaway side view of the back end of the hollow handle of the present invention along line 23—23 of FIG. 20 showing detail of the reservoir and activation switch.

DETAILED DESCRIPTION OF THE DRAWINGS

Figure 3:
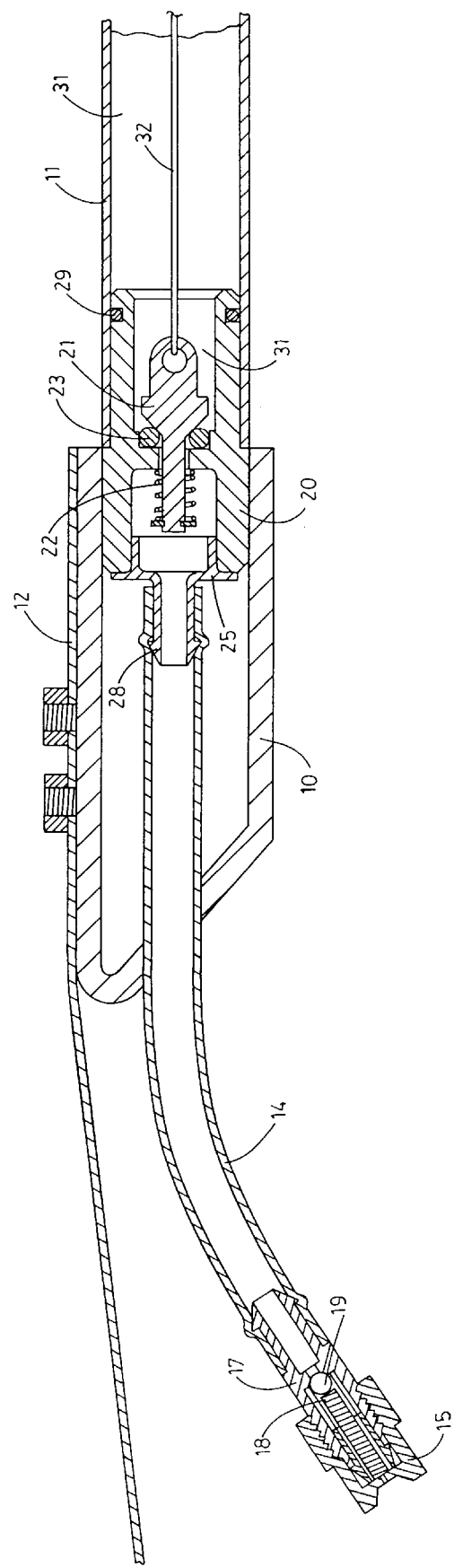
FIG. 3 is a detail cutaway side view of the forward end of the hollow handle of the present invention along line 3—3 of FIG. 1 showing detail of the spray mechanism.
Figure 4:
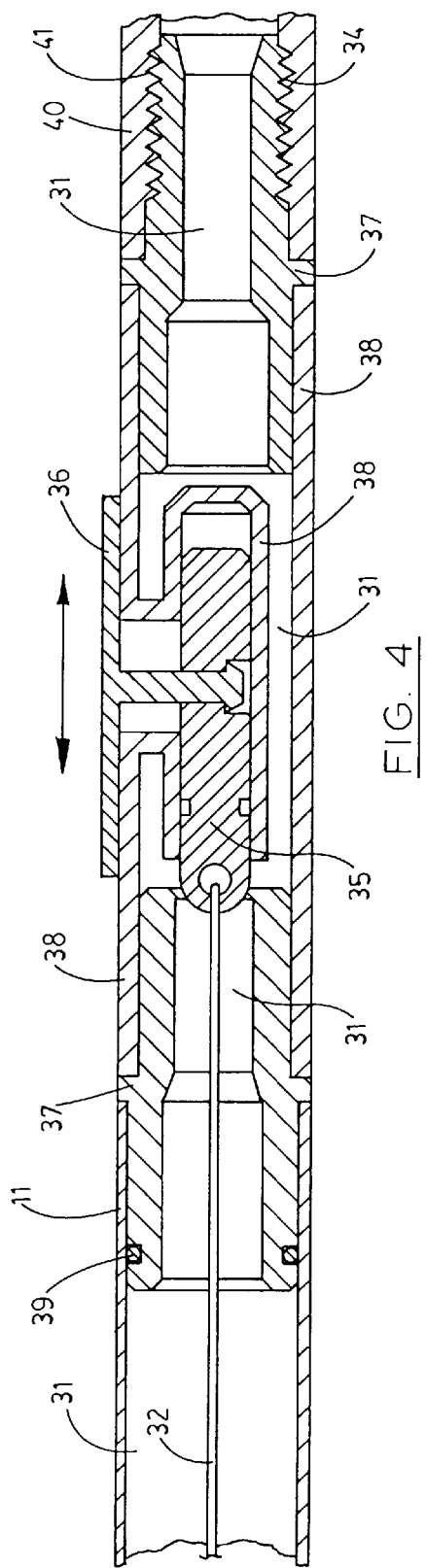
FIG. 4 is a detail cutaway side view of the mid section of the hollow handle of the present invention along line 4—4 of FIG. 1 showing detail of the activation switch mechanism.

Referring to the drawings wherein like reference characters designate like or corresponding parts throughout the several views, and referring particularly to FIGS. 1 through 5, it is seen that the invention includes a garden implement having an elongated handle 11 and a ferrule housing 10 attached to an appropriate head 12. Although a lawn rake embodiment 12 is shown in the drawings, any other appropriate gardening implement working head may also be used, including, without limitation, a shovel, spade, hoe, cultivator, axe, pick, mattock, bow rake, level head rake, pitch fork, manure fork, etc.

A sprayer tube 14 having an adjustable nozzle 15 at one end is attached to and extends inside housing 16. A valve assembly 20 (See FIG. 3) is provided at the end of handle 11 inside housing 10, and includes a piston member 21 held in place against an annular seal 23 by spring member 22. A hose barb 25 is provided at the end of assembly 20 which includes an annular lipped male flange 28 over which tube 14 is securely attached.

A reservoir 31 is provided inside hollow handle 11 for holding the material to be sprayed. Annular seal 29 prevents the material from seeping out between the walls of handle 11 and assembly 20.

A cable member 32 is attached to piston 21 at the end opposite the spring 22. Cable 32 stretches through reservoir 31 and is attached at its opposite end to slidable member 35 which is part of a larger switch assembly 38 (see FIG. 4). Switch assembly 38 is integrated into handle 11 using housing 37 and is situated between the valve assembly 20 and pump handle 51 at a location that is convenient for the user to reach while holding the handle. Member 35 is attached to a slidable T-shaped external switch 36. By sliding switch 36, member 35 pulls cable 32, thereby pulling piston 21 away from seal 23, and allowing material inside reservoir 31 to escape down tube 14 to nozzle 15. Annular seal 39 prevents leakage from between the wall of handle 11 and housing 37.

The end of housing 37 opposite from said cable 32 is provided with a series of helical screw threads 34 which receive a corresponding set of threads 41 located in the helical bore of handle end member 40. Unscrewing member 41 from housing 37 opens reservoir 31 so that it may be refilled. It is to be noted that material in reservoir is free to flow around inside housing 37 around switch assembly 38, and is also free to flow inside valve assembly 20 up to seal 23. Cable 32, valve piston 21, and the end of slidable member 35 are all in contact with the fluid in the reservoir.

Figure 5:
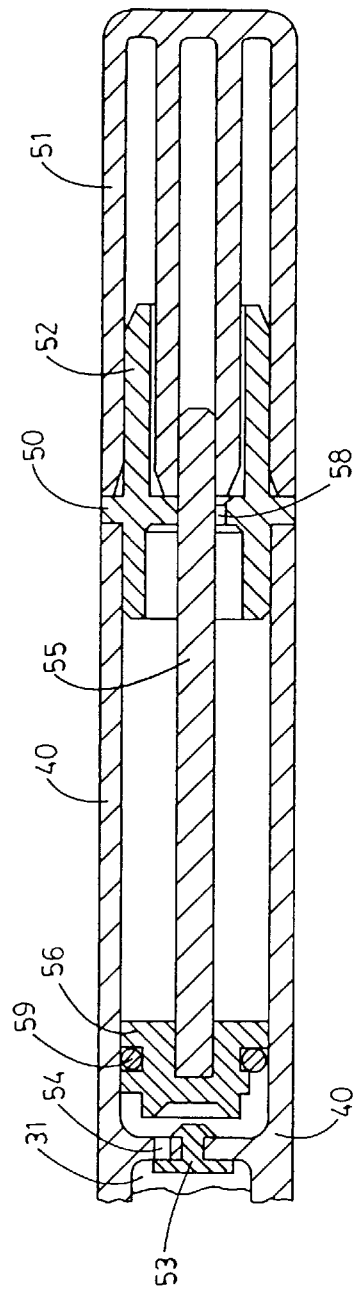
FIG. 5 is a detail cutaway side view of the back end of the hollow handle of the present invention along line 5—5 of FIG. 1 showing detail of the pump mechanism.
Figure 6:
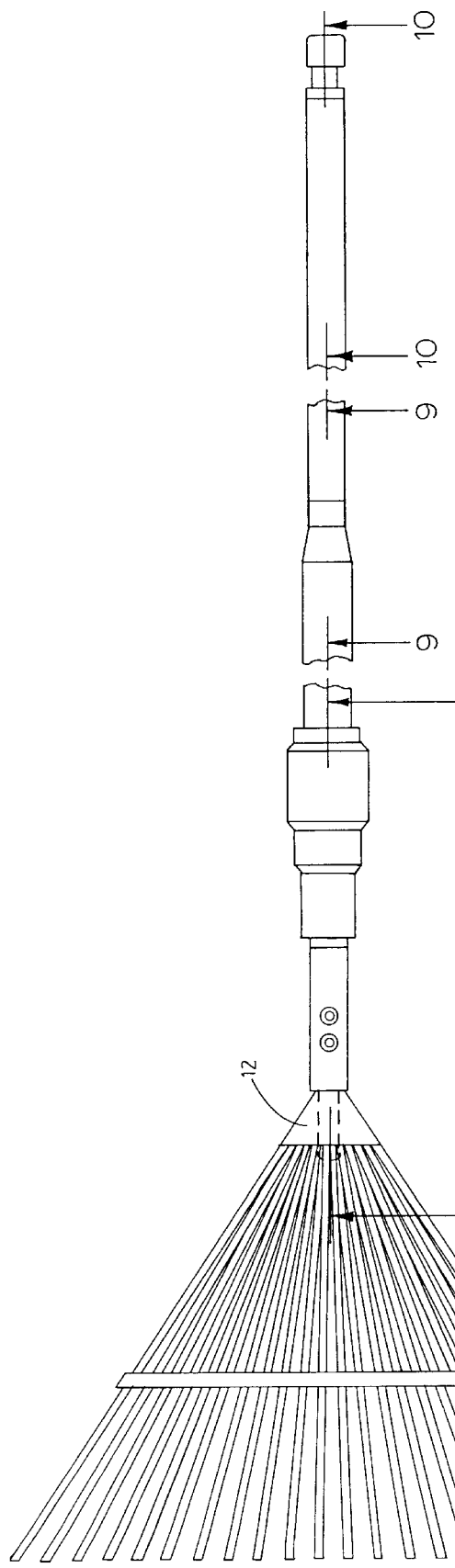
FIG. 6 is a top plan view of an alternative rake embodiment of the present invention showing the location of the spray nozzle, removable reservoir and integrated pump.
Figure 7:
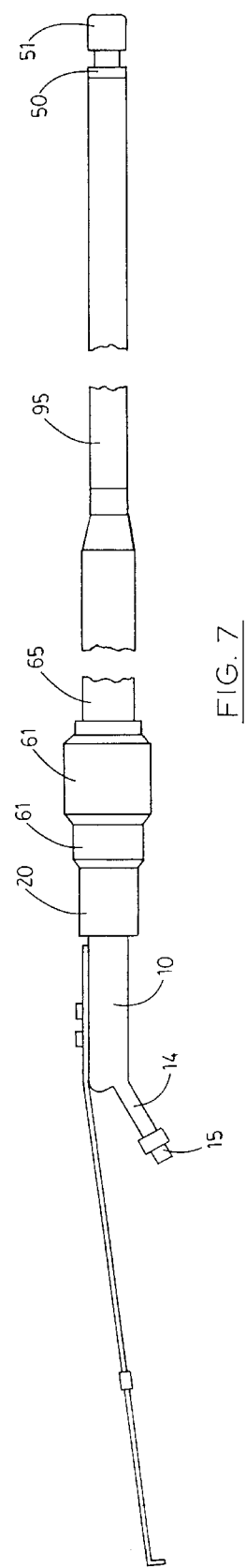
FIG. 7 is a side view of the alternative embodiment shown in FIG. 6.

A hand pump assembly 50 is integrated into the end of handle end member 40 (see FIG. 5). This assembly includes a pump handle 51 slidable over a set of annular fingers 52. Handle 51 is attached to a central shaft 55 which is, in turn, attached to a slidable valve member 56. A tempered annular seal 59 is provided in specially shaped valve member 56 such that air is allowed to pass across said seal 59 as the shaft 55 is pulled out, but which seals said valve as shaft 55 is pushed in. Port 58 is provided in assembly 50 to allow air into the pump. A check valve 53 is provided at the upper end of reservoir 31 inside member 40. As valve member 56 is pushed in, air is compressed through opening 54 into reservoir 31. Check valve 53 prevents this air from escaping back through opening 54 allowing pressure to be built up inside reservoir 31 with successive pump strokes.

The now-pressurized fluid in reservoir 31 may be released, as described above, by activation of switch 36 which opens valve piston 21. As the pressurized fluid travels down hose 14, it pushes check ball 19 out of position allowing the fluid to escape through nozzle 15. When switch 36 and valve piston 35 are closed, spring 18 closes check ball 19 against the nozzle housing 17 thereby preventing any excess fluid inside tube 14 from inadvertently leaking out where it might damage plants.

A second embodiment is shown in FIGS. 6–10. In this embodiment, end housing 10 includes an integrated hollow shaft 14 having a nozzle assembly 15 at the end (see FIG. 8). Valve assembly 20 surrounds a slidable member 71 held in place by spring means 22. A valve in the form of a ball retainer 73 is disposed inside member 71 and is movable against hollow cylindrical body 72. An opening 77 into chamber 16 is provided in crucible 78 on the opposite side of ball retainer 73. A cartridge retaining member 75 is also disposed inside member 71 adjacent to cylindrical body 72. Member 75 is hollow, and includes retaining flanges 79 and blister-piercing flange 80.

Cartridge 81 is filled with fluid 90 (e.g. herbicide) and is provided with a breakable blister seal at one end. As cartridge is placed over flange 80, the blister seal is broken allowing the fluid inside cartridge 80 to communicate with the inside of members 72 and 75 down around ball valve 73, through the openings between members 78 of the crucible (see FIG. 8A) into chamber 16 and down tube 14. An optional annular ridge 82 on cartridge 81 fits into optional groove 76 in the retaining flanges 79 of member 75 to hold cartridge 81 more securely in place.

Outside housing 61 is provided to hold valve assembly 20 and cartridge holder 65. Corresponding helical screw threads are provided on housing 61 and one end of holder 65 to allow said members to be detachably screwed together to facilitate inserting, removing and replacing cartridge 81. At the other end of housing 65 an opening is provided through which shaft 91 is slidably placed (see FIGS. 9 and 10). One end of shaft 91 protrudes inside housing 65 and terminates in an annular flange 92 which engages the bottom of cartridge 81. The opposite end of shaft 91 passes through hollow body member 95 and terminates in slidable handle 51.

Figure 8:
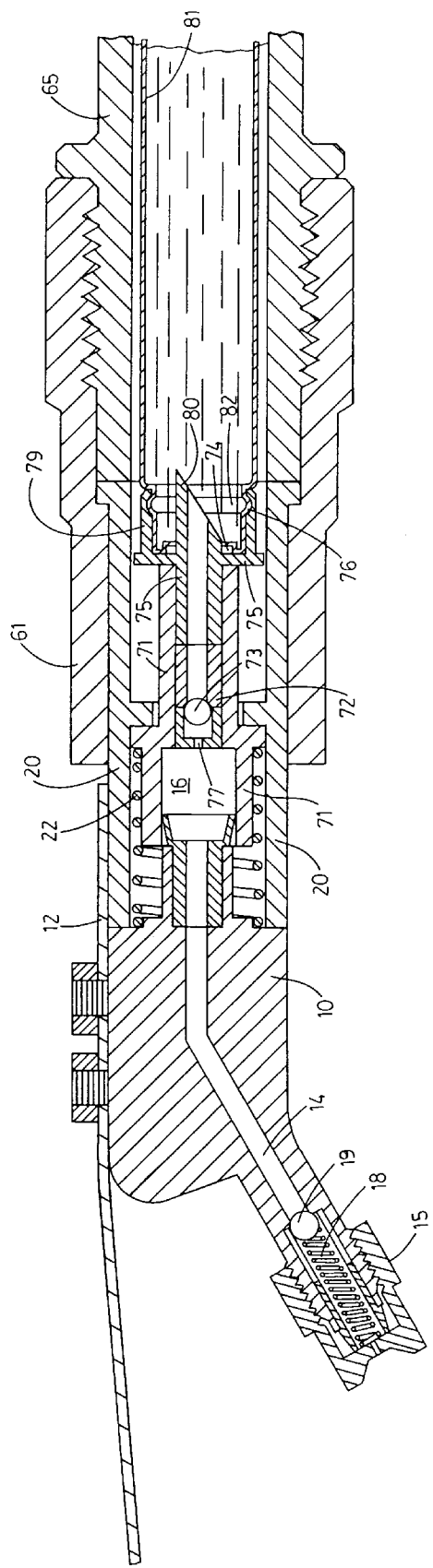
FIG. 8 is a detail cutaway side view of the forward end of the hollow handle of the present invention along line 8—8 of FIG. 6 showing detail of the spray mechanism and detachable handle for receiving the reservoir.
Figure 9:
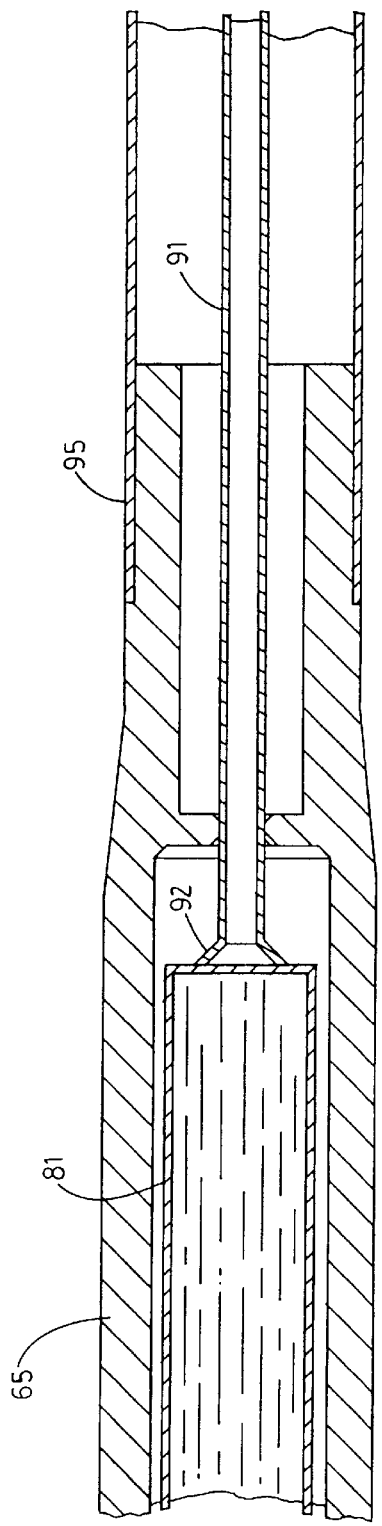
FIG. 9 is a detail cutaway side view of the mid section of the hollow handle of the present invention along line 9—9 of FIG. 6 showing detail of the upper end of the reservoir.
Figure 10:
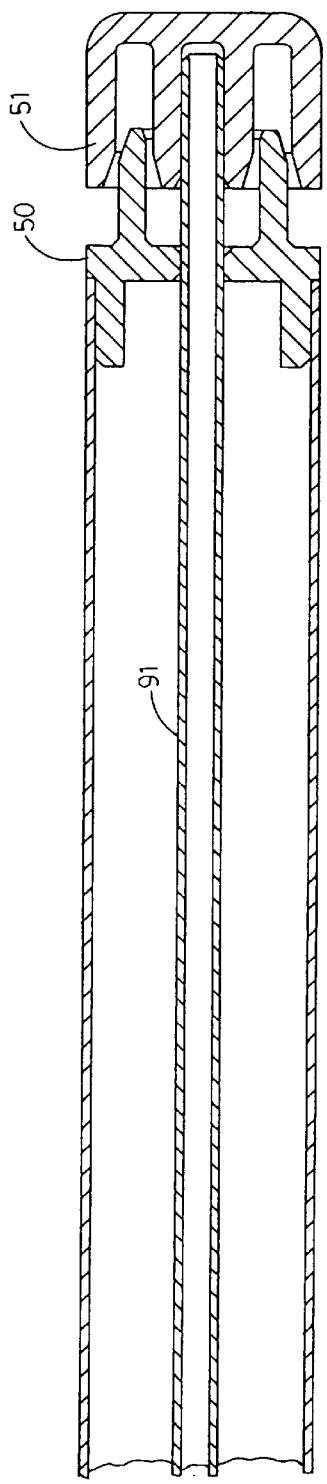
FIG. 10 is a detail cutaway side view of the back end of the hollow handle of the present invention along line 10—10 of FIG. 6 showing detail of the pump mechanism.
Figures 11, 12:
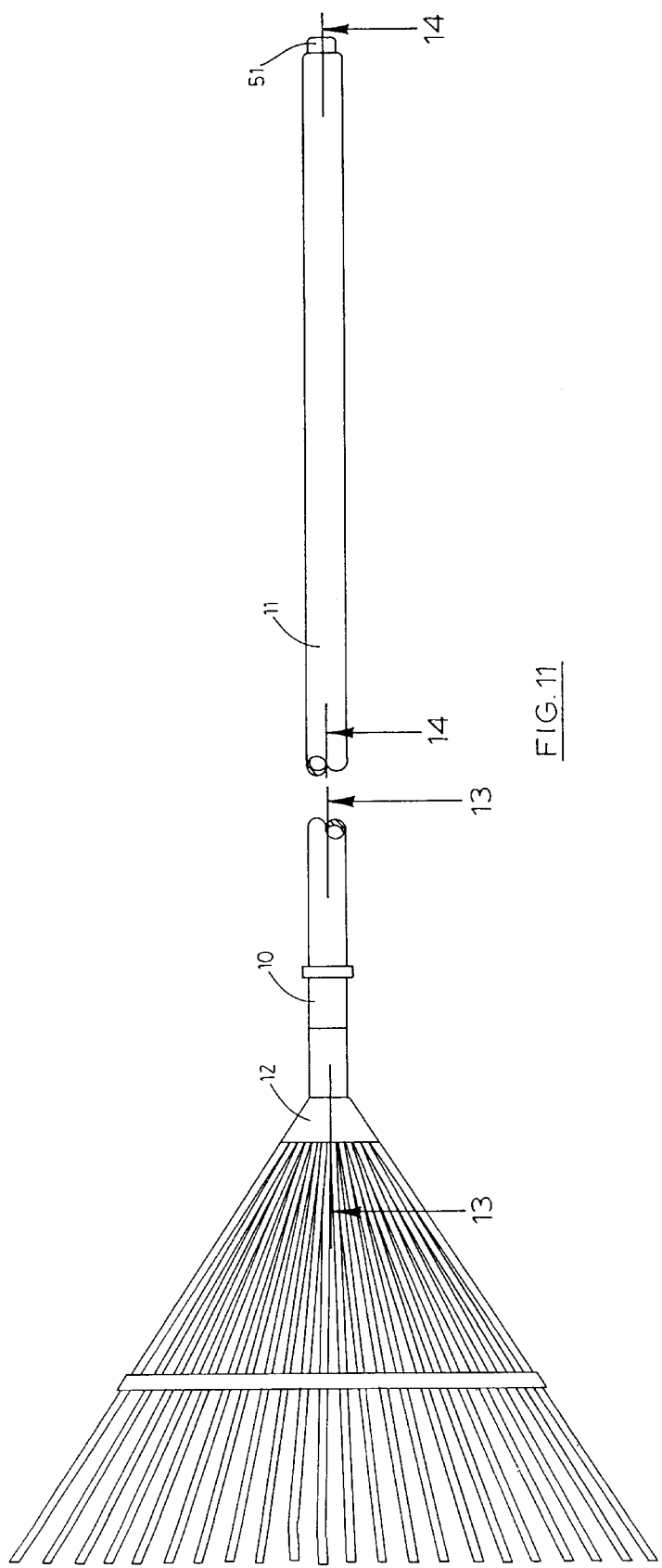
FIG. 11 is a top plan view of another alternative rake embodiment of the present invention showing the location of the spray nozzle, removable reservoir and integrated pump.
FIG. 12 is a side view of the alternative embodiment shown in FIG. 11.
Figure 17:
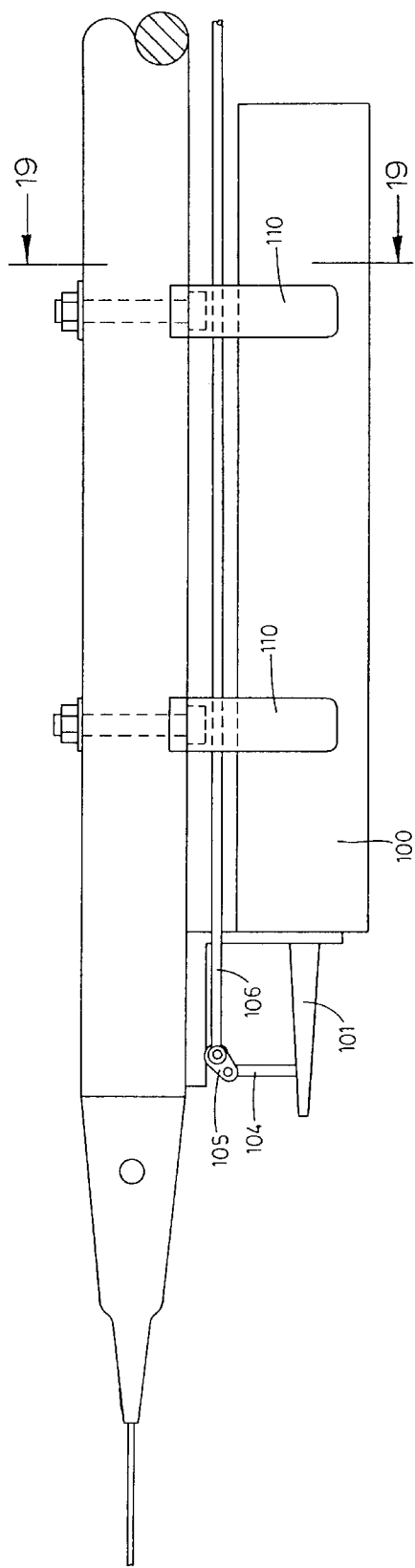
FIG. 17 is a detail side view of the forward end of the present invention along line 17—17 of FIG. 15 showing detail of the exterior reservoir and spray mechanism.
Figure 18:
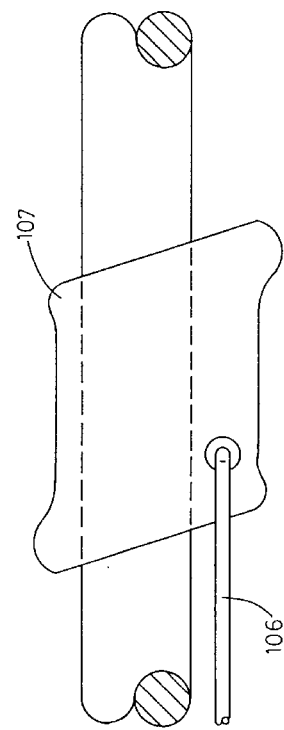
FIG. 18 is a side view of the middle of hollow handle of the present invention along line 18—18 of FIG. 15 showing detail of the activation switch.
Figure 19:
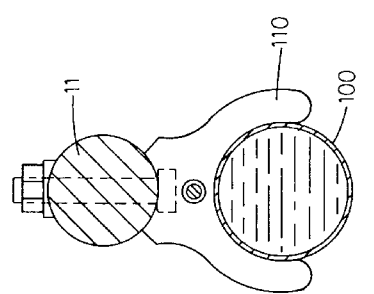
FIG. 19 is a detail cross-sectional view along line 19—19 of FIG. 17 showing the solid handle and filled reservoir.

When handle 51 is pushed in, it pushes shaft 91 against the bottom of cartridge 81. The walls of cartridge 81 should be rigid so as to transfer this pressure to members 79, 75 and 71. This pressure squeezes spring 22 thereby pressing ball valve 73 firmly against sleeve 72 (as shown in FIG. 8) preventing back flow into cartridge 81. Pressure is thereby transferred to the fluid which has flowed down into chamber 16 and tube 14. As the pressurized fluid travels down hose 14, it pushes check ball 19 out of position allowing the fluid to escape through nozzle 15. When pressure is released, spring 18 closes check ball 19 against housing 10 thereby preventing any excess fluid inside tube 14 from inadvertently leaking out where it might damage plants.

A third embodiment is shown in FIGS. 11–14. In this embodiment, hollow handle 11 is detachable from housing 10 in order to allow a (pressurized) cartridge 100 to be placed therein (see FIG. 13). Cartridge 100 includes a deformable pointed end 101 which fits into a corresponding slot in housing 10. When deformed, cartridge end 101 opens allowing the (pressurized) fluid inside to escape down channel 14 through nozzle 15. Spring 22 holds cartridge in place so that when at rest, the pointed end is closed. When pressure is applied to button 51 it is transferred down shaft 91 to cartridge 100, thereby pushing the pointed end 101 against the inside of housing 10. This opens the cartridge causing a spray to escape through nozzle 15. Removal of pressure on button 51 causes the spring 22 to close the cartridge end 101 and thereby shut off the spray. Cartridge 100 may not be pressurized, in which case gravity allows the flow to escape through nozzle 15.

A fourth embodiment is shown in FIGS. 20–23. In this embodiment, hollow handle 11 is removable from ferrule 10 and is disposable. The entire inside area of such handle 11 is filled with pressurized fluid. A pointed deformable cap 101 is found at the end of handle 11, and is inserted into ferrule housing 10 as shown in FIG. 22. A series of linkages 104, 105 and 106 communicate between a slidable activation switch 107 on the outside of handle 11, and deformable cap 101. By sliding switch 107, the linkages push against deformable cap 101, opening it. Once open, the fluid flows through cap 101 into channel 14 in ferrule housing 10 and escapes to the outside. Sliding switch 107 back releases the linkages closing the fluid reservoir inside handle 11.

A fifth embodiment is shown in FIGS. 15–18. In this embodiment an external cartridge 100 is provided which includes a deformable pointed end 101. When deformed, cartridge end 101 opens allowing the pressurized fluid inside to escape. The deformation of the pointed end 101 is accomplished using a set of linkages 104, 105 and 106 connected to a slidable switch assembly 107 on solid handle 11. Sliding the switch 107 forward moves the linkages which deform the pointed end of cartridge 101, opening it. Sliding the switch 107 moves the linkages back allowing the cartridge to close again. cartridge 100 is held in place by a set of mounting members 110 along handle 11.

DESCRIPTION OF THE PREFERRED EMBODIMENTS

In the preferred embodiment shown in FIGS. 1–5, the hollow handle 11 of the present invention should be made of a strong and rigid material such as wood, metal or plastic. The ferrule housing 10 should be made of similar material. Hose 14 should be made of metal or rigid plastic, and nozzle 15 should be metal or other suitable material. The working head 12 should be a rake, but can be any appropriate garden implement, including, without limitation, a shovel, spade, hoe, cultivator, axe, pick, mattock, bow rake, level head rake, pitch fork, manure fork, etc.

The piston valve 21, cable 32 and slidable member 35 are all in direct contact with the potentially corrosive fluid inside handle 11, and should therefore be made of non-corrosive plastic or nylon material to avoid damage, fatigue and unnecessary wear. Switch assembly 38 should be otherwise removed from the fluid, and should not allow the fluid to seep inside.

Annular seals 23, 39 and 59 should be made of appropriate non-corrosive rubberized material. The helical screw threads of body members 37 and 40 should be long enough to provide a snug, waterproof closure. Shaft 55 should be made of rigid metal or plastic. Check valve 53 should be deformable so as to allow air in, but of a sufficiently thick cross section to withstand high pressure and prevent leakage back out.

The blister cartridge 81 of the second embodiment should have a rigid body in order to transmit pressure to the movable retaining member 75. The blister end of the cartridge may be of foil or other suitable material in order that it may be easily punctured by a sharp object such as flange 80.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. An improved garden implement comprising an elongated hollow handle, a working head at the proximal end of said handle, a spray nozzle attached to said handle adjacent said working head, a removable reservoir cartridge containing fluid under pressure adapted to fit inside said handle, said cartridge having a closable, deformable pointed end and a flat opposite end, means for opening said handle to accept said cartridge, fluid communication means between the pointed end of said cartridge and said nozzle, biasing means in said handle between said cartridge and said nozzle, and force transmission means at the distal end of said handle in communication with the flat end of said cartridge, whereby as force is transmitted to the cartridge, said deformable end is pushed open allowing the pressurized fluid therein to escape to the outside through said nozzle.

2. The garden implement described in claim 1 wherein the deformable pointed end of said cartridge is closed and sealed when at rest but which opens when deformed allowing rapid escape of fluid under pressure in the form of a spray.

3. The garden implement described in claim 2 wherein a movable button is provided at the distal end of said hollow handle connected to an elongated shaft provided inside said handle between said button and the flat end of said cartridge for transmitting force to said cartridge.

4. The garden implement described in claim 3 wherein an spring is provided in said handle between the cartridge and the nozzle positioned around the deformable pointed end of said cartridge for preventing deformation of said pointed end until force is transmitted to the cartridge.

5. The garden implement described in claim 1 wherein the handle of said implement is made of two parts having corresponding helical threads thereon for joining or separating such parts thereby allowing the handle to open and close for receiving or removing a cartridge.

6. The garden implement described in claim 1 wherein the handle of said implement is made of two parts having interlocking members thereon for joining or separating such parts thereby allowing the handle to open and close for receiving or removing a cartridge.

7. An improved garden implement comprising a ferrule attached to a working head, a hollow handle in the form of an elongated removable reservoir cartridge containing fluid under pressure adapted to be removably attached to said ferrule, said cartridge having a closable, deformable pointed end for insertion into said ferrule, a spray opening in said ferrule adjacent said working head, a removable switch on said handle, and motion transfer means between said switch and said deformable pointed end, whereby as said switch is operated said motion transfer means deforms said pointed end opening it and allowing the pressurized fluid therein to escape to the outside.

8. The garden implement described in claim 7 wherein the deformable pointed end of said cartridge is closed and sealed when at rest but which opens when deformed allowing rapid escape of fluid under pressure in the form of a spray.

9. An improved garden implement comprising a ferrule attached to a working head, said ferrule having an interior region in communication with the exterior through a narrow channel adjacent to said working head, a removable reservoir cartridge containing fluid under pressure, said cartridge having a closable, deformable pointed end adapted to fit into said interior region, the deformable pointed end of said cartridge being closed and sealed when at rest but which opens when deformed allowing rapid escape of fluid under pressure in the form of a spray which exits through said channel, and a means for transmitting force to said cartridge in order to deform the pointed end thereof allowing the pressurized fluid therein to escape to the exterior.

* * * * *